US008817917B2

(12) United States Patent
Kroeger et al.

(10) Patent No.: US 8,817,917 B2
(45) Date of Patent: Aug. 26, 2014

(54) METHOD AND APPARATUS FOR IMPLEMENTING SIGNAL QUALITY METRICS AND ANTENNA DIVERSITY SWITCHING CONTROL

(75) Inventors: Brian W. Kroeger, Sykesville, MD (US); Paul J. Peyla, Elkridge, MD (US)

(73) Assignee: iBiquity Digital Corporation, Columbia, MD (US)

(*) Notice: Subject to any disclaimer, the term of this patent is extended or adjusted under 35 U.S.C. 154(b) by 360 days.

(21) Appl. No.: 13/165,325

(22) Filed: Jun. 21, 2011

(65) Prior Publication Data
US 2012/0328057 A1    Dec. 27, 2012

(51) Int. Cl.
*H04L 27/06* (2006.01)
*H04L 27/26* (2006.01)
*H04B 7/08* (2006.01)
*H04B 17/00* (2006.01)
*H04L 1/20* (2006.01)

(52) U.S. Cl.
CPC ........ *H04B 17/0042* (2013.01); *H04L 27/2663* (2013.01); *H04B 7/0805* (2013.01); *H04L 1/20* (2013.01); *H04B 7/0814* (2013.01); *H04L 27/2678* (2013.01)
USPC ........... 375/340; 375/267; 375/347; 375/349; 375/351; 455/13.3; 455/272; 455/277.1; 455/277.2; 455/575.7

(58) Field of Classification Search
CPC .... H04H 20/26; H04B 7/0802; H04B 7/0805; H04B 7/0811; H04B 7/0814; H04B 7/0817; H04B 7/082; H04B 7/0822; H04B 7/0825; H04B 7/0831; H04B 7/0834; H04B 7/0868; H04B 7/0871; H04B 7/0874; H04B 7/088; H04B 7/0888

USPC ............... 455/13.3, 575.7, 272, 277.1, 277.2; 375/340, 347, 267, 349, 351
See application file for complete search history.

(56) References Cited

U.S. PATENT DOCUMENTS

| | | | |
|---|---|---|---|
| 4,752,968 A | 6/1988 | Lindenmeier et al. | |
| 6,539,063 B1 | 3/2003 | Peyla et al. | |
| 6,891,898 B2 | 5/2005 | Peyla et al. | |
| 6,925,293 B2 * | 8/2005 | Lindenmeier et al. | 455/276.1 |
| 7,106,809 B2 | 9/2006 | Whikehart et al. | |
| 7,127,218 B2 * | 10/2006 | Lindenmeier | 455/101 |

(Continued)

FOREIGN PATENT DOCUMENTS

EP    1693978 A2    8/2006

OTHER PUBLICATIONS

Francois-Xavier Socheleau et al. "Non Data-Aided SNR Estimation of OFDM Signals" IEEE Communications Letters, IEEE Service Center, Nov. 1, 2008, vol. 10, No. 11, pp. 813-815.

(Continued)

*Primary Examiner* — Sophia Vlahos
(74) *Attorney, Agent, or Firm* — Robert P. Lenart, Esq.; Pietragallo Gordon Alfano Bosick & Raspanti, LLP

(57) ABSTRACT

A method for detecting the digital quality of a radio signal includes: receiving a radio signal including a digital portion modulated by a series of symbols each including a plurality of samples; computing correlation points between endpoint samples in cyclic prefix regions of adjacent symbols; and using the correlation points to produce a digital signal quality metric. Receivers that implement the method are also provided.

14 Claims, 7 Drawing Sheets

(56) References Cited

U.S. PATENT DOCUMENTS

| | | | |
|---|---|---|---|
| 7,221,688 B2 | 5/2007 | Vanness | |
| 7,305,056 B2 | 12/2007 | Kroeger | |
| 7,426,232 B2 * | 9/2008 | Matsuoka et al. | 375/148 |
| 7,564,416 B2 * | 7/2009 | Lindenmeier et al. | 343/713 |
| 7,565,126 B2 * | 7/2009 | Shatara et al. | 455/272 |
| 7,724,850 B2 | 5/2010 | Kroeger et al. | |
| 7,733,983 B2 | 6/2010 | Kroeger et al. | |
| 7,933,368 B2 | 4/2011 | Peyla et al. | |
| 2004/0008614 A1 * | 1/2004 | Matsuoka et al. | 370/203 |
| 2007/0021085 A1 | 1/2007 | Kroeger | |
| 2008/0298515 A1 | 12/2008 | Peyla et al. | |
| 2009/0079656 A1 | 3/2009 | Peyla et al. | |

OTHER PUBLICATIONS

Shatara et al., "Automotive FM Diversity Systems, Part I, Propagation Channel Modeling and Multipath Review", SAE Technical Paper Series 2007-01-1731, 2007 World Congress, Detroit, MI, Apr. 16-19, 2007.

Shatara et al., "Automotive FM Diversity Systems, Part II, Analog Systems", SAE Technical Paper Series 2007-01-1732, 2007 World Congress, Detroit, MI, Apr. 16-19, 2007.

Shatara et al., "Automotive FM Diversity Systems, Part III, Digital Systems", SAE Technical Paper Series 2007-01-1734, 2007 World Congress, Detroit, MI, Apr. 16-19, 2007.

Shatara et al., "Dual Receiver with Phase and Switched Diversity for Background Processing and Reception Improvement", SAE Technical Paper Series 2008-01-1059, 2008 World Congress, Detroit, MI, Apr. 14-17, 2008.

National Radio Systems Committee, "NRSC-5-B In-band/on-channel Digital Radio Broadcasting Standard", Apr. 2008.

Shatara et al., "Low Cost Switched Diversity System", SAE Technical Paper Series 2009-01-0960, SAE International, 2009.

* cited by examiner

METHOD AND APPARATUS FOR IMPLEMENTING SIGNAL QUALITY METRICS AND ANTENNA DIVERSITY SWITCHING CONTROL

FIELD OF THE INVENTION

This invention relates to digital radio broadcasting receivers, and more particularly to methods and apparatus for implementing signal quality metrics and switching control logic for antenna diversity switching in a radio receiver.

BACKGROUND OF THE INVENTION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ Technology, developed by iBiquity Digital Corporation, is one example of an IBOC implementation for digital radio broadcasting and reception.

IBOC DAB signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog to digital radio while maintaining their current frequency allocations.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC DAB promotes economy of spectrum while enabling broadcasters to supply digital quality audio to the present base of listeners.

The National Radio Systems Committee, a standard-setting organization sponsored by the National Association of Broadcasters and the Consumer Electronics Association, adopted an IBOC standard, designated NRSC-5, in September 2005. NRSC-5, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. iBiquity's HD Radio Technology is an implementation of the NRSC-5 IBOC standard.

Other types of digital radio broadcasting systems include satellite systems such as XM Radio, Sirius and WorldSpace, and terrestrial systems such as Digital Radio Mondiale (DRM), DRM+, Eureka 147 (branded as DAB), DAB Version 2, and FMeXtra. As used herein, the phrase "digital radio broadcasting" encompasses digital audio broadcasting including in-band on-channel broadcasting, as well as other digital terrestrial broadcasting and satellite broadcasting.

Antenna diversity techniques are used to mitigate the effects of distortion and outages due to multipath propagation of the received FM signal. Diversity can also accommodate the directional characteristics of glass-embedded window antennas. A variety of diversity antenna techniques have been developed and deployed for use with automotive FM receivers. Although all FM receivers, including tabletop, home theater, and portable receivers, could benefit from antenna diversity, only automotive receivers presently employ diversity techniques. Furthermore, the diversity algorithms developed for analog FM receivers are generally not appropriate for HD Radio digital reception.

It would be desirable to have a metric for the quality of a received radio signal that can be used to control antenna diversity switching, as well as switching control logic appropriate for the IBOC signals.

SUMMARY

In a first aspect, the invention provides a method for detecting the quality of a radio signal, including: receiving a radio signal including a digital portion modulated by a series of symbols each including a plurality of samples; computing correlation points between endpoint samples in cyclic prefix regions of adjacent symbols; and using the correlation points to produce a digital signal quality metric.

In another aspect, the invention provides an apparatus including: a radio receiver including an input for receiving a radio signal having a digital portion modulated by a series of symbols each including a plurality of samples, and a processor for computing correlation points between samples in cyclic prefix regions of adjacent symbols to produce a digital signal quality metric.

In another aspect, the invention provides a method including: receiving a radio signal including an analog-modulated portion; digitally sampling an analog-modulated portion of the radio signal to produce a plurality of samples; and using a ratio between an average magnitude and an RMS magnitude of a block of the samples to compute an analog signal quality metric.

In another aspect, the invention provides an apparatus including: a radio receiver including an input for receiving a radio signal having an analog-modulated portion; and a processor for digitally sampling the analog-modulated portion to produce a plurality of samples; and using a ratio between an average magnitude and an RMS magnitude of a block of the samples to compute an analog signal quality metric.

In another aspect, the invention provides a method including: (a) receiving a radio signal on a plurality of antenna elements; (b) computing a signal quality metric for the signal received on each of the antenna elements; (c) determining a difference value between the signal quality metric for the currently selected antenna element and the signal quality metric for each of the other antenna elements; (d) finding the minimum difference value; (e) determining (1) if a dwell value for the currently selected antenna element is greater than a multiple of the minimum difference value and (2) if the signal quality metric for the currently selected antenna element is less than a threshold value; and (f) if either or both of (1) or (2) in step (e) is true, then switching from the currently selected element to one of the other antenna elements for supplying the radio signal to a receiver, and repeating steps (b) through (e).

In another aspect, the invention provides an apparatus including: a plurality of antenna elements for receiving a radio signal; a switch for connecting one or more of the antenna elements to an input of a receiver; and a processor for (a) computing a signal quality metric for the signal received on each of the antenna elements, (b) determining a difference value between the signal quality metric for the currently selected antenna element and the signal quality metric for each of the other antenna elements, (c) finding the minimum difference value, (d) determining (1) if a dwell value is greater than a multiple of the minimum difference value and (2) if the signal quality metric for first antenna element is less than a threshold value, and (e) if either or both of (1) or (2) in step (e) is true, then controlling the switch to switch from the currently selected element to one of the other antenna elements for supplying the radio signal to the receiver and repeating steps (a) through (d).

In another aspect, the invention provides a method including: receiving a radio signal on a plurality of antenna elements; computing a signal quality metric for the signal received on each of the antenna elements; using the signal quality metric for an antenna element currently supplying the radio signal to a receiver to determine if diversity switching is desired; and producing a proxy control signal that causes a diversity switch control to implement a desired switching of the antenna elements.

In another aspect, the invention provides a method including: receiving a radio signal on a plurality of antenna elements, wherein the radio signal includes an analog modulated portion and a digitally modulated portion; computing an analog signal quality metric for the analog modulated portion of the received radio signal; computing a digital signal quality metric for the digital modulated portion of the received radio signal; and using either the analog signal quality metric or the digital signal quality metric to select one or more of the antenna elements to be connected to a receiver input, wherein a reaction time for selecting the antenna elements based on the analog signal quality metric is shorter than a reaction time for selecting the antenna elements based on the digital signal quality metric.

In another aspect, the invention provides an apparatus including: a plurality of antenna elements for receiving a radio signal, wherein the radio signal includes an analog modulated portion and a digitally modulated portion; a switch for connecting one or more of the antenna elements to an input of a receiver; and a processor for computing an analog signal quality metric for the analog modulated portion of the received radio signal, computing a digital signal quality metric for the digital modulated portion of the received radio signal, and using either the analog signal quality metric or the digital signal quality metric to produce a switch control signal for selecting one or more of the antenna elements to be connected to a receiver input; wherein a reaction time for selecting the antenna elements based on the analog signal quality metric is shorter than a reaction time for selecting the antenna elements based on the digital signal quality metric.

DETAILED DESCRIPTION

Figure 1:
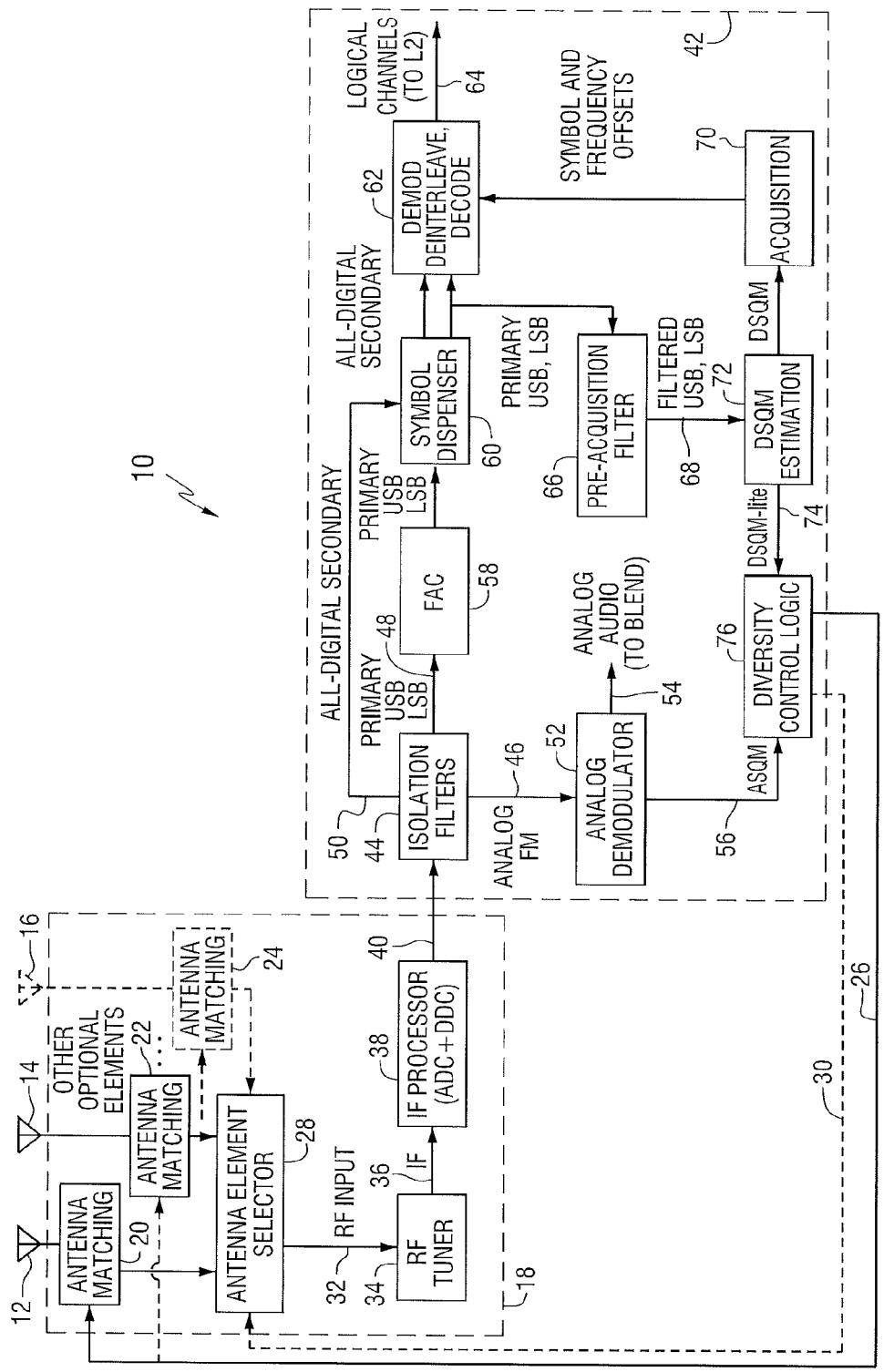
FIG. 1 is a block diagram of an FM receiver for use in an in-band on-channel digital radio broadcasting system.

In one aspect, this invention relates to methods and apparatus for implementing signal quality metrics that can be used to implement antenna diversity switching in HD Radio receivers. Descriptions of an HD Radio broadcasting system are provided in U.S. Pat. No. 7,933,368, for a "Method and Apparatus for Implementing a Digital Signal Quality Metric" and United States Patent Application Publication No. 2009/0079656, which are hereby incorporated by reference.

As shown in United States Patent Application Publication No. 2009/0079656, a hybrid FM IBOC waveform includes an analog modulated signal located in the center of a broadcast channel, a first plurality of evenly spaced orthogonally frequency division multiplexed subcarriers in an upper sideband, and a second plurality of evenly spaced orthogonally frequency division multiplexed subcarriers in a lower sideband. The digitally modulated subcarriers are divided into partitions and various subcarriers are designated as reference subcarriers. In one implementation, a frequency partition is a group of 19 OFDM subcarriers containing 18 data subcarriers and one reference subcarrier.

The hybrid waveform shown in United States Patent Application Publication No. 2009/0079656 includes an analog FM-modulated signal, plus digitally modulated subcarriers. The subcarriers are located at evenly spaced frequency locations. The amplitude of each subcarrier can be scaled by an amplitude scale factor.

Diversity With HD Radio Signals

HD Radio signals always carry a digital component, and an analog host signal is also present in the more-common hybrid signals. The digital signal component is more tolerant of fading than its analog counterpart, due to digital properties of interleaving, forward error correction (FEC) coding and frequency/time diversity. Selective fading can be tracked with channel state information (CSI) estimates over time and frequency for the digital signal. The CSI is used to derive weights for the symbol information as a function of its estimated reliability. However, antenna diversity is still needed to accommodate directional antenna patterns or long, flat-fading outages lasting a substantial portion of the interleaver span. Since the digital signal is coherently detected and tracked, each antenna switching event is likely to cause symbol corruption and temporary loss in CSI and coherent tracking. Modifications to the digital modem have been previously designed to somewhat mitigate the effects of the switching, although switching losses are still significant. Therefore antenna diversity switching for digital signals can be a slower process than for analog signals. Specifically, for the digital signal component, antenna switching is needed to avoid long, broadband outages due to slow fading (including fixed conditions) as well as antenna directionality losses.

A different antenna switching strategy would be more appropriate for the FM analog signal component. The difference in diversity switching strategy between analog and digital components of an HD Radio hybrid FM signal can be summarized as follows. For FM analog signals, the switching reaction time is generally small (tens of microseconds) to avoid signal corruption in a fade, or frequency-selective null. For digital signals, the desired switching reaction time can be tens of milliseconds, or greater, to avoid long, broadband outages due to slow fading (including fixed conditions) as well as antenna directionality losses. Therefore, it would be desirable to use different switching criteria to handle diversity switching with a hybrid signal, depending on whether the audio output is derived from the digital or analog signal. Importantly, the FM analog diversity switching algorithm will not work when the IBOC signal is all digital (not hybrid). The switching action would be excessive if the analog signal were missing.

One embodiment of the present invention includes some of the elements of a receiver described in U.S. Pat. No. 7,933,368, for a "Method and Apparatus for Implementing a Digital Signal Quality Metric", which is hereby incorporated by reference.

FIG. 1 is a functional block diagram of an FM receiver 10 having multiple antenna elements 12, 14, and 16 and employing antenna element diversity, as well as adaptive impedance matching (AIM) functions. AIM is described in United States Patent Application Publication No. 2010/014495. In one embodiment, an antenna element 12 can be an antenna incorporated into an earbud wire; antenna element 14 can be a loop antenna; and element 16 represents one or more additional, optional antennas. Within an RF/IF processor 18, a first antenna matching circuit 20 dynamically matches the impedance of antenna element 12 to the receiver, a second antenna matching circuit 22 dynamically matches the impedance of antenna element 14 to the receiver, and optional additional antenna matching circuits 24 can be used to dynamically match the impedance of any additional antenna elements to the receiver. While the antenna matching functionality is shown in FIG. 1 as part of the RF/IF processor, this functionality may be implemented in other discrete components of a receiver device such as an RF front end. Antenna element selector 28 selects a signal from one of the antenna elements based on an antenna element diversity control signal 30, and passes that signal as an RF input 32 to RF tuner 34. Alternatively, the antenna element selector can pass on the sum or difference of the signals received on the various antenna elements. The RF tuner produces an IF signal 36, which is converted from analog to digital and digitally down converted by IF processor 38 to produce a baseband signal 40 at a rate of 744,187.5 complex samples per second.

The baseband signal is received by baseband processor 42, which applies isolation filters 44 to produce a digitally sampled, analog signal 46 at a rate of 186,046.875 complex samples per second, primary upper sideband and lower sideband digital signals 48 at a rate of 186,046.875 complex samples per second, and an all-digital secondary signal 50 at a rate of 372,093.75 complex samples per second. Analog demodulator 52 receives the digitally sampled analog signal 46 and produces an analog audio output 54 and an analog signal quality metric (ASQM) 56. The operation of analog demodulator 52 and calculation of the ASQM is described in more detail below. A first-adjacent cancellation operation 58 is applied to the primary upper and lower sidebands in order to minimize any interference from a first-adjacent signal. Symbol dispenser 60 aligns and dispenses the incoming data stream into segments representing one OFDM symbol. The all-digital secondary signal and primary upper and lower sidebands are then demodulated, deinterleaved, and decoded (62), and then passed as logical channels 64 to Layer 2 of the receiver protocol stack for demultiplexing, as described in US Patent Application Publication No. 2009/0079656. A pre-acquisition filtering process 66 is applied to the primary upper and lower sidebands to produce filtered upper and lower sideband signals 68 at a rate of 46,511.71875 complex samples per second. Acquisition processing 70 produces symbol timing and frequency offsets. DSQM estimation 72 calculates a digital signal quality metric (using for example, the DSQM algorithm disclosed in U.S. Pat. No. 7,933,368, or the DSQM-lite algorithm disclosed below). DSQM-lite is output on line 74, which is used by the diversity control logic 76 after acquisition has been established. Pre-acquisition filtering and DSQM estimation are shown and described in more detail below. Diversity control logic 76 receives the analog signal quality metric (ASQM) and digital signal quality metric (DSQM-lite), and produces antenna element diversity control signal 30. Diversity control logic 76 preferably receives the ASQM and DSQM-lite signals at an update rate of roughly 20 Hz or possibly lower for home or portable devices.

When the receiver is used in a hybrid IBOC system, both an analog signal quality metric (ASQM) and a digital signal quality metric (DSQM-lite) are needed for antenna diversity switching. Algorithms for efficient ASQM and DSQM-lite computation are described herein.

To construct the DSQM-lite algorithm, the computational complexity of the DSQM algorithm (of U.S. Pat. No. 7,933,368) has been reduced by taking advantage of symbol synchronization after the signal has been acquired, establishing frequency tracking and symbol synchronization. The DSQM algorithm of U.S. Pat. No. 7,933,368 computes correlation points for all the samples of each symbol, although only the correlation samples in the cyclic-prefix regions are useful. This is done because the locations of the cyclic-prefix samples within each symbol are not known prior to acquisition. However, since the locations of the cyclic-prefix regions of the symbols are known following acquisition, there is no need to compute correlation points across the entire symbol. As used in this description, symbol acquisition means locating and synchronizing to the symbol boundaries. This allows a simplified DSQM algorithm that computes only the filtered correlation-peak samples in the symbol-synchronized cyclic-prefix region. This simplified algorithm is labeled DSQM-lite. Since DSQM-lite is based on DSQM, the reader is referred to the DSQM U.S. Pat. No. 7,933,368, and only the details of computing DSQM-lite are shown here.

In one example, both the DSQM and DSQM-lite algorithms process groups of 16 symbols to produce a digital signal quality metric. While 16 symbols have been determined to be sufficient to reliably enhance and locate the correlation peak, the invention is not limited to any particular number of symbols. The processing described below includes two operations: pre-acquisition filtering and acquisition processing. First, an efficient isolation filter architecture is presented, including pre-acquisition filtering.

The efficient implementation of isolation filters, and decimation to minimum sample rates, can reduce subsequent MIPS requirements, and save power. Recognition of some complementary characteristics of these filters is important in realizing the efficient filter design. The combination of input sample rate, bandwidths, and locations of the analog FM signal and digital sidebands, along with the decimate-by-4 frequencies, offers a convenient filter architecture.

To prevent DSQM degradation due to large second-adjacent channels, each primary sideband is filtered prior to acquisition processing. To reduce the MIPS requirement, this filter can be implemented as a decimate-by-16 filter (from the original sample rate of 744,187.5 Hz), with an output sample rate of 46,511.71875 Hz. In one implementation shown in FIG. 2, each digital sideband is first decimated by 4 to 186,046.875 Hz for normal OFDM demodulation of each sideband. Although not shown in FIG. 2, FAC (First Adjacent Canceling, an interference mitigation algorithm) processing may be performed on each sideband.

Figure 2:
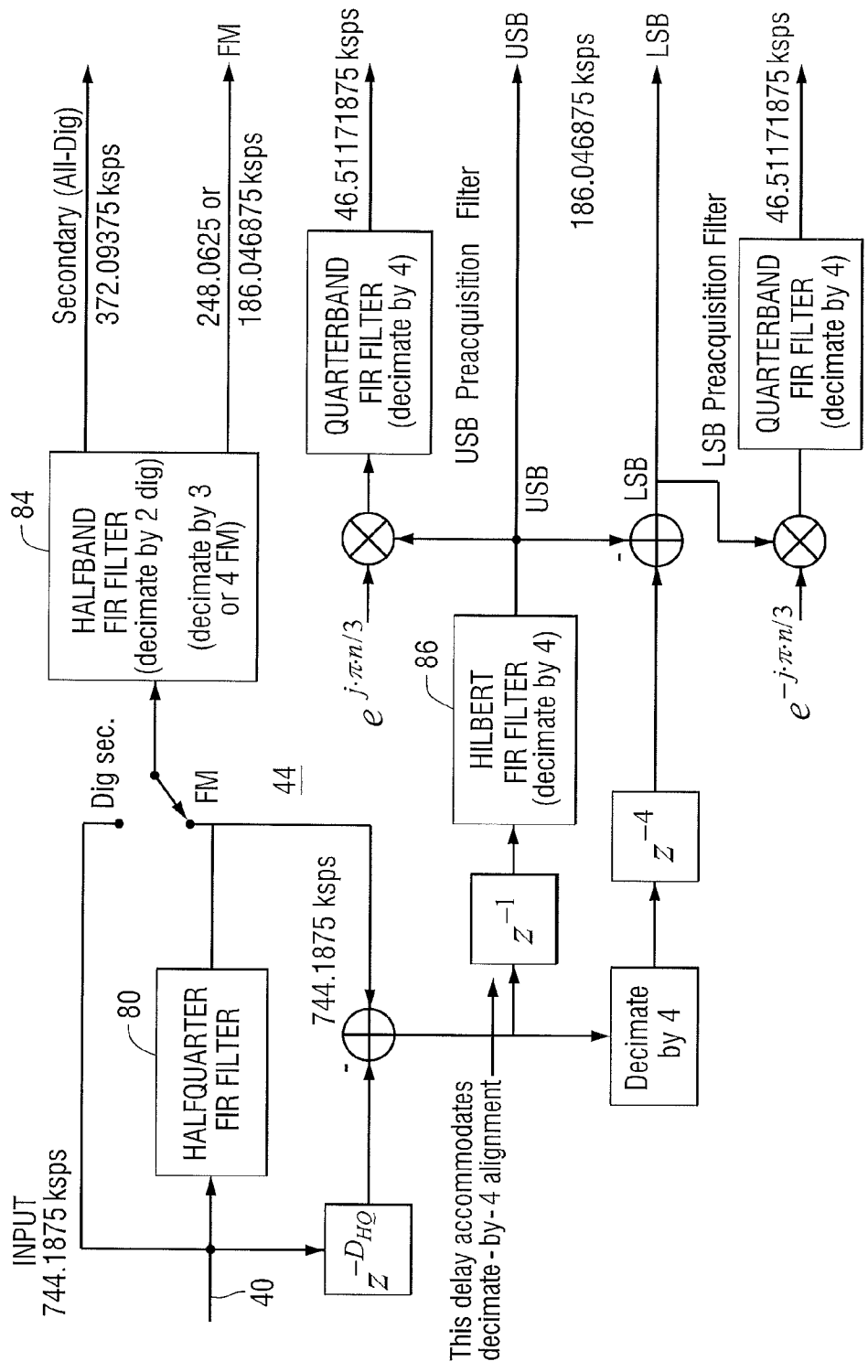
FIG. 2 is a block diagram of isolation filters that can be used in the receiver of FIG. 1.

FIG. 2 is a functional block diagram of the isolation filters 44. The input signal 40 from the front end circuit is input to a halfquarter finite impulse response (FIR) filter 80. This "half-quarter" filter establishes the locations of all the transition bands. This set of characteristics allows for exploitation of an input filter having both halfband and quarterband symmetries, resulting in zero coefficients except for every fourth sample. This is followed by an efficient halfband Hilbert transform filter 86 to separate the upper and lower digital sidebands, and another similar halfband filter 84 to separate and reduce the sample rate of the analog FM signal and to isolate the secondary digital sidebands of an all digital signal. In FIG. 2, all signals are complex, and all filters are real, except the Hilbert FIR filter 86. Halfband and quarterband symmetry is common language of filter designers. These symmetries result in some efficiency advantages, and can be exploited here in some unique ways (e.g., adding and subtracting instead of refiltering some frequency bands in the isolation filters).

FIG. 2 shows that the isolation filters can decimate the center baseband sample rate of fs=744,187.5 by a factor of either 3 or 4. This center isolation filter is used for isolating the analog FM signal. The 6-dB filter bandwidth, however, is ±93 kHz in either case. The less-aggressive decimation by 3 can prevent some small frequency components just above 93 kHz from aliasing back into the output. However, simulation results indicate that this benefit is not significant in Total Harmonic Distortion plus Noise (THDN) performance, even in 120% overmodulation conditions. Another potential benefit of the decimate-by-3 option is that there is less distortion in FM detection due to the difference (instead of the derivative) approximation of the digitally-sampled detection. However, the distortion compensation demonstrated (simulated) for the FM detector virtually eliminates this loss. Therefore the decimate-by-4 option to 186 kHz seems preferred in the interest of MIPS reduction.

The digital sidebands are then translated in frequency by $\pm\exp(j\cdot\pi\cdot n/3)$ for the upper sideband (USB) or lower sideband (LSB), respectively. The net frequency translation is ±155,039.0625 Hz from the original sideband frequency due to sample-rate aliasing (186,046.875-Hz shift to dc) and the exponential frequency shift (31,007.8125 Hz). This places the subcarriers previously-centered at ±155,039.0625 Hz at zero Hz for subsequent lowpass filtering on each upper and lower sideband, respectively. The frequency-shifted upper sideband signal $x_{upper}$ and lower sideband signal $x_{lower}$ are:

$$x_{upper}[n] = USB[n] \cdot \exp\{j \cdot n \cdot \pi/3\}$$

$$x_{lower}[n] = LSB[n] \cdot \exp\{-j \cdot n \cdot \pi/3\}$$

for the nth sample in a semi-infinite stream.

Then the cascaded pre-acquisition filter decimates by another factor of 4 with a 23-tap FIR filter. The integer taps defined by hqb represent a quarter-band filter, and can be scaled by $2^{-15}$ to yield a unity-gain passband. The expression hqb represents the filter impulse response (filter taps) for a FIR filter with quarterband symmetry. In one example:

$$hqb = (40, 100, 130, 0, -386, -852, -912, 0, 2080, 4846,$$
$$7242, 8192, 7242, 4846, 2080, 0, -912, -852, -386, 0,$$
$$130, 100, 40)^T.$$

For example, the decimated filter output samples for each sideband are computed as:

$$y[m] = \sum_{k=0}^{22} x[k + 4 \cdot m - 11] \cdot hqb[k]$$

for the mth sample in a semi-infinite stream
where y[m] is the decimated filter output, x is the decimation-filter input, and hqb is the filter impulse response (filter taps) for a FIR filter with quarterband symmetry.

The DSQM-lite processing starts with these sideband signals. Due to a cyclic prefix applied at the transmitter, the first and last 6 samples (at the preacquisition sample rate of 46.5 kcsps) of each transmitted symbol are highly correlated. DSQM-lite processing reveals this correlation by complex-conjugate multiplying each sample in an arbitrary (or first) symbol with a sample in a preceding (or second) symbol 128 samples away. When the products of these multiplications are synchronized to a symbol's cyclic-prefix region, they form a 6-sample peak with a common phase, and an amplitude that reflects a root-raised-cosine pulse shape. To reduce the noise in the peak, the corresponding products of samples in the cyclic prefix regions of 16 contiguous symbols are "folded" on top of one another (i.e., pointwise added) to form a 6-sample result.

Since the symbol boundaries are already established in the symbol dispenser (symbol synchronizer) when the DSQM-lite is used for diversity switching, there is no need to compute more than one peak, and the phase information is not used for diversity switching. Only the DSQM-lite magnitude between zero and one is used.

The following algorithm provides a computationally efficient means of calculating a digital signal quality metric for antenna diversity switching. It includes aspects of the acquisition version of DSQM described in U.S. Pat. No. 7,933,368, however the complexity is reduced because the location of symbol boundaries is known once acquisition is complete. Therefore, computations need only occur on samples comprising the correlation peak. The process includes pre-acquisition filtering and DSQM-lite calculation. This function is called only after acquisition is successful.

After initial acquisition, a substantial reduction in MIPS can be realized by limiting the processing of signal samples to the cyclic-prefix regions of the symbols. Since the symbol samples are already framed by the symbol dispenser in the receiver of FIG. 1, it is relatively straightforward to select the cyclic-prefix regions for DSQM-lite processing. In one embodiment, 6 samples are processed at each end of the 135-sample symbol at the decimate-by-16 sample rate. In the example described below, only sample indices 1 through 6 and 129 through 134 are computed; sample 0 is not needed since it should be synchronized to have a zero value.

The center of pre-acquisition decimation filter hqb for a 540-sample input symbol will be aligned at input sample indices 4, 8, 12, 16, 20, and 24, as well as at corresponding locations 512 samples later (i.e., at indices 516, 520, 524, 528, 532, and 536). After initial acquisition, the indexed input samples outside the present symbol boundary can be assigned a zero value. Further simplification can be realized by re-indexing the output samples. Re-indexing is simply renumbering the signal samples (for convenience).

Vectors for complex frequency shifting and filter coefficients are computed and pre-stored. One example pre-stored complex exponential is a 6-element vector fshft. The upper USB and lower LSB sideband signals are cyclically (modulo-6 elements) multiplied by the vector fshft to shift the center of the target OFDM subcarriers to zero Hz, as described above.

$$fshft = \begin{pmatrix} 1 \\ \exp\{j \cdot \pi/3\} \\ \exp\{j \cdot 2 \cdot \pi/3\} \\ -1 \\ \exp\{-j \cdot 2 \cdot \pi/3\} \\ \exp\{-j \cdot \pi/3\} \end{pmatrix} = \begin{pmatrix} 1 \\ 0.5 + j \cdot 0.866 \\ -0.5 + j \cdot 0.866 \\ -1 \\ -0.5 - j \cdot 0.866 \\ 0.5 - j \cdot 0.866 \end{pmatrix}$$

The correlation samples are weighted with a 6-tap FIR filter whose impulse response is matched to the shape of the peak. FIR filters h and h2 are matched to the shapes of the peaks to be computed for 6-element vectors u and v, respectively.

$$h[m] = \cos\left(\frac{\pi \cdot (2 \cdot m - 5)}{14}\right); \text{ and } h2[m] = \frac{h^2[m]}{2}$$

for $m = 0, 1, \ldots, 5$ $$h = \begin{pmatrix} 0.434 \\ 0.782 \\ 0.975 \\ 0.975 \\ 0.782 \\ 0.434 \end{pmatrix}; \text{ and } h2 = \begin{pmatrix} 0.094 \\ 0.306 \\ 0.475 \\ 0.475 \\ 0.306 \\ 0.094 \end{pmatrix}$$

The DSQM-lite computation includes 6 steps.

STEP 1: Place the frequency-shifted symbol endpoints pshft and qshft for the upper and lower sidebands in vectors for each symbol:

$$pshft_{upper}[n] = \begin{cases} USB[n-7] \cdot fshft[\text{mod}(n+5, 6)]; & \text{for } n > 6 \\ 0; & \text{otherwise} \end{cases}$$

$$qshft_{upper}[n] = \begin{cases} USB[n+505] \cdot fshft[\text{mod}(n+1, 6)]; & \text{for } n < 35 \\ 0; & \text{otherwise} \end{cases}$$

$$pshft_{lower}[n] = \begin{cases} LSB[n-7] \cdot fshft^*[\text{mod}(n+5, 6)]; & \text{for } n > 6 \\ 0; & \text{otherwise} \end{cases}$$

$$qshft_{lower}[n] = \begin{cases} LSB[n+505] \cdot fshft^*[\text{mod}(n+1, 6)]; & \text{for } n < 35 \\ 0; & \text{otherwise} \end{cases}$$

for $n = 0, 1 \ldots, 42$ sample index for each successive symbol where $pshft_{upper}$ the frequency-shifted starting cyclic prefix of the upper sideband, $qshft_{upper}$ is the frequency-shifted ending cyclic suffix of the upper sideband, $pshft_{lower}$ is the frequency-shifted starting cyclic prefix of the lower sideband, and $qshf_{lower}$ is the frequency-shifted ending cyclic suffix of the lower sideband. As used in this description, the "endpoints" are groups of samples near the symbol boundaries. Individual samples in these groups are referred to as endpoint samples.

STEP 2: These vectors ($pshft_{upper}$, $qshft_{upper}$, $pshft_{lower}$, $qshft_{plowr}$) are filtered with quarterband filter hqb, and then decimated by a factor of 4. The filtered results are $p_{upper}$, $q_{upper}$, $p_{lower}$, and $q_{lower}$.

$$p_{upper}[m] = \sum_{k=0}^{22} pshft_{upper}[k + 4 \cdot m] \cdot hqb[k]$$

$$q_{upper}[m] = \sum_{k=0}^{22} qshft_{upper}[k + 4 \cdot m] \cdot hqb[k]$$

$$p_{lower}[m] = \sum_{k=0}^{22} pshft_{lower}[k + 4 \cdot m] \cdot hqb[k]$$

$$q_{lower}[m] = \sum_{k=0}^{22} qshft_{lower}[k + 4 \cdot m] \cdot hqb[k]$$

for $m = 0, 1, \ldots, 5$

STEP 3: A "conjugate multiply and fold" operation is mathematically described for each upper or lower sideband by the following equations:

$$u_{upper}[m] = \sum_{s=0}^{S-1} p_{upper}[s, m] \cdot q^*_{upper}[s, m]$$

$$u_{lower}[m] = \sum_{s=0}^{S-1} p_{lower}[s, m] \cdot q^*_{lower}[s, m]$$

for $m = 0, 1, \ldots, 5$ where $u_{upper}[m]$ is the 6-sample correlation vector result for the upper sideband, $u_{lower}[m]$ is the 6-sample correlation vector result for the lower sideband, s is the folded symbol index, and S=16 symbols is the DSQM-lite block size.

STEP 4: A normalization factor v is used to scale the DSQM-lite to a 0 to 1 range:

$$v_{upper}[m] = \sum_{s=0}^{S-1} (|p_{upper}[s, m]|^2 + |q_{upper}[s, m]|^2)$$

$$v_{lower}[m] = \sum_{s=0}^{S-1} (|p_{lower}[s, m]|^2 + |q_{lower}[s, m]|^2)$$

for $m = 0, 1, \ldots, 5$ where $v_{upper}[m]$ is the normalization factor for the upper sideband, $v_{lower}[m]$ is the normalization factor for the lower sideband, s is the folded symbol index, and S symbols is the DSQM-lite block size, which is 16 in this example.

STEP 5: The quality Q value for either the lower or upper sideband is then computed as:

$$Q_{upper} = \frac{\left|\sum_{m=0}^{5} u_{upper}[m] \cdot h[m]\right|^2}{\left(\sum_{m=0}^{5} v_{upper}[m] \cdot h_2[m]\right)^2}$$

$$Q_{lower} = \frac{\left|\sum_{m=0}^{5} u_{lower}[m] \cdot h[m]\right|^2}{\left(\sum_{m=0}^{5} v_{lower}[m] \cdot h_2[m]\right)^2}$$

where $Q_{upper}$ upper is the quality value ($0 \leq Q_{upper} \leq 1$) for the upper sideband, and $Q_{lower}$ is the quality value ($0 \leq Q_{lower} \leq 1$) for the lower sideband, where filter coefficients h[m] and the $h_2[m]$ are pre-computed (i.e., computed and stored in a vector, as previously defined).

STEP 6: Finally, the composite DSQM-lite metric is computed (0<DSQM<1).

$$DSQM = \max(Q_{upper}, Q_{lower}, \min(1, Q_{upper} + Q_{lower} - 0.2))$$

While the calculations can be performed on one sideband, it is more robust using both sidebands because one may be corrupted by an interferer or frequency-selective fade while the other sideband is viable. That is why the quality Q metrics for each sideband can be added. However, 0.2 is subtracted for noise elimination from a low-value Q of a sideband, since it has no useful contribution at that point.

Figure 3:
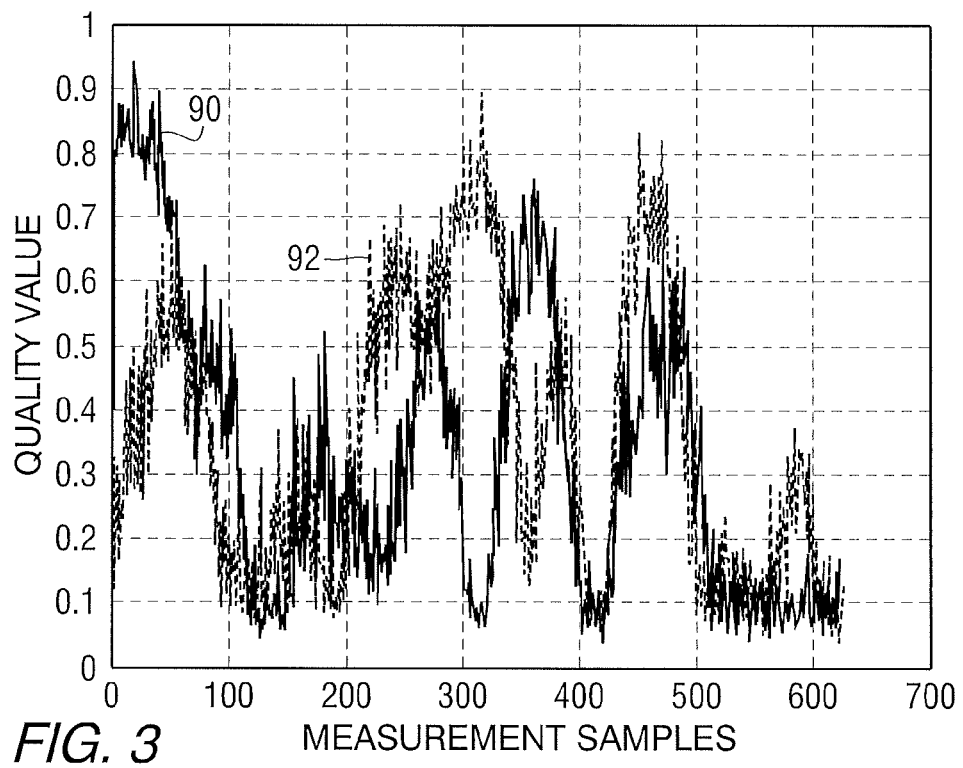
FIG. 3 is a graph of quality values for upper and lower digital sidebands over several measurement samples.

FIG. 3 shows the quality Q values for the upper and lower sidebands for an FM Hybrid IBOC signal in multipath Rayleigh fading. Lines 90 and 92 are the $Q_{upper}$ and $Q_{lower}$ values over roughly 30 seconds, where the horizontal axis is in units of measurement samples consisting of 16 OFDM symbols. The plot shows that the frequency-selective fading affects the signal quality (Q) differently for each digital sideband. The fading for the analog FM signal in the center of the channel (not shown here) is also somewhat uncorrelated with the digital sidebands. That is another reason why the fading metric (and diversity switching algorithm) designed for analog FM signals is not appropriate for the digital signal. Importantly, the FM analog diversity switching algorithm will not work when the IBOC signal is all digital (not hybrid). The switching action would be excessive if the analog signal were missing.

In one aspect, the invention encompasses a radio receiver that includes an input for receiving signals from one or more of a plurality of antennas and a processor or processing circuitry that performs the DSQM-lite processing described above to produce a digital signal quality metric that can be used to select an input signal from one or more of the antennas. For the purposes of this description, the word "processor" encompasses one or more signal processing devices or processing circuitry that performs the processing steps described herein.

ASQM Computation

As shown in FIG. 1, the analog portion of the radio signal is digitally sampled to produce a plurality of samples. The analog signal quality metric (ASQM) value is computed for blocks of samples from the FM halfband filter shown in FIG. 2. The recommended block size should span about 1 OFDM symbol (about 3 msec). This block size is both convenient and practical. It is convenient because some receivers already process signals framed at the symbol rate. The block size is large enough to yield a reasonably accurate result, and small enough to accommodate flat fading over the time span. The ASQM computation exploits the constant-modulus property of the FM signal where, in the absence of signal corruption, each sample has a constant magnitude. Both noise and selective fading cause variations in the FM signal sample energies over the symbol span of K samples. The ASQM can also be affected by the bandwidth of the FM preselection filter. The ASQM is based on the ratio between the average (mean) magnitude and the RMS magnitude of the samples over the span of 1 symbol. This ratio is raised to a power p so that subsequent averaging of ASQM values over time is not biased from the nominal threshold of about 0.5. The greatest slope and an inflection point in the ASQM versus the carrier-to-noise-density ratio (C/No) occur at about 0.5. This also provides convenient scaling, similar to other metrics used in the antenna diversity algorithm. The ideal ASQM can be calculated as:

$$\text{ASQM\_ideal} = \left(\frac{\text{mean}}{\text{rms}}\right)^p = \left(\frac{\frac{1}{K}\cdot\sum_{k=0}^{K-1}|x_k|}{\sqrt{\frac{1}{K}\cdot\sum_{k=0}^{K-1}|x_k|^2}}\right)^p = \left(\frac{\sum_{k=0}^{K-1}\sqrt{\text{Re}\{x_k\}^2+\text{Im}\{x_k\}^2}}{\sqrt{K\cdot\sum_{k=0}^{K-1}[\text{Re}\{x_k\}^2+\text{Im}\{x_k\}^2]}}\right)^p$$

where $x_k$ is the $k^{th}$ sample of the estimation block (e.g., one symbol-size vector of K elements), and k is sample index from 0 to K−1.

Since the RMS value is the root-sum-square of the average (mean) magnitude and the standard deviation of the magnitude over the symbol time, then the average magnitude per sample is always less than or equal to its RMS value. This property results in an ASQM value between zero and one. When ASQM=1, then there is no signal corruption, and the magnitude is constant. The minimum value of ASQM=$K^{-p/2}$ occurs when there is only one nonzero sample. Generally all samples of the FM signal will have nearly constant magnitude (with phase or frequency modulation) for a good FM signal; otherwise, it is noise-like. For convenience the ideal ASQM computation can be modified to avoid square roots in a more practical usage. An exponent value can be chosen to accommodate the desired threshold target of about 0.5. The modified practical ASQM result behaves similarly to the ideal.

$$\text{ASQM} = \left(\frac{\left(\sum_{k=0}^{K-1}[\text{Re}\{x_k\}^2+\text{Im}\{x_k\}^2]\right)^2}{K\cdot\sum_{k=0}^{K-1}[\text{Re}\{x_k\}^2+\text{Im}\{x_k\}^2]^2}\right)^8$$

The ASQM samples are used by the antenna diversity switching algorithm. An ASQM value greater than about 0.5 generally indicates a good signal quality, with a maximum signal quality approaching 1. ASQM values less than 0.5 are indicative of poor signal quality, with the lowest quality approaching 0. Values around 0.5 are important to determine antenna switching actions in the diversity switching algorithm.

The above ASQM computation is based on the ratio of the square of the mean, to the mean of the squared values of the signal magnitude-squared. However since the magnitude is positive and cannot have a zero mean, then the ASQM cannot reach zero. An exponent power of 8 can be used to suppress smaller values of the ASQM. It can be shown that although the ASQM approaches one for an ideal uncorrupted FM signal, noise only (AWGN) yields a value of one half to the exponent power of 8.

PROOF: let $u$ and $v$ be zero − mean normal i.i.d. random variables:

$$\lim_{K\to\infty}\frac{\left(\sum_{k=0}^{K-1}[u^2+v^2]\right)^2}{K\cdot\sum_{k=0}^{K-1}[u^2+v^2]^2} = \frac{(E\{u^2\}+E\{v^2\})^2}{E\{u^4\}+2\cdot E\{u^2\cdot v^2\}+E\{v^4\}};$$

but $E\{u^2\}=E\{v^2\}=\sigma^2$, and
$E\{u^4\}=E\{v^4\}=2\cdot\sigma^4$ (normal);

Then $\lim_{K\to\infty}\frac{\left(\sum_{k=0}^{K-1}[u^2+v^2]\right)^2}{K\cdot\sum_{k=0}^{K-1}[u^2+v^2]^2} = \frac{E\{u^2\}^2}{E\{u^4\}} = \frac{1}{2}$ where E is the expected value, and u and v are Gaussian (normal) distributed random variables.

A simple adjustment to the previous ASQM expression extends the range from zero to one, with a target threshold of 0.5.

$$ASQM = \left( \frac{2 \cdot \left( \sum_{k=0}^{K-1} [\text{Re}\{x_k\}^2 + \text{Im}\{x_k\}^2] \right)^2}{K \cdot \sum_{k=0}^{K-1} [\text{Re}\{x_k\}^2 + \text{Im}\{x_k\}^2]^2} - 1 \right)^8$$

The number of samples K in the estimation block has been chosen to span one symbol, so K=540 at the example sample rate (about 186 ksps).

Figure 4:
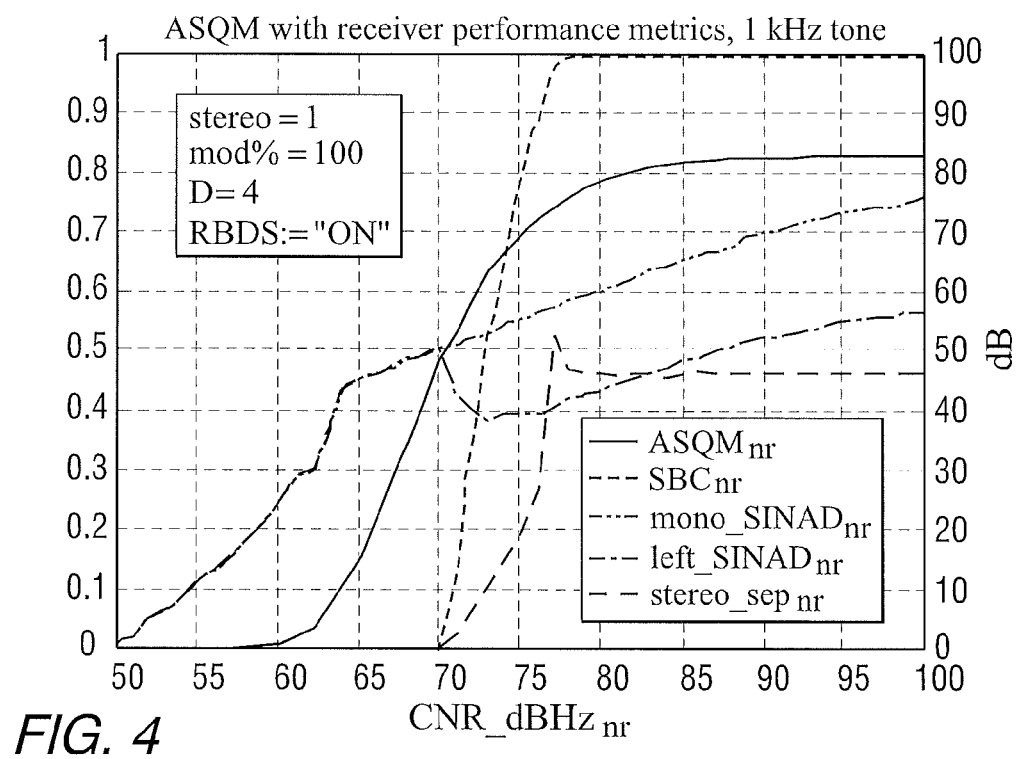
FIG. 4 is a graph of analog signal quality metric as a function of carrier-to-noise ratio.

FIG. 4 shows the ASQM value plotted as a function of carrier-to-noise-ratio CNR (dB_Hz). A value of CNR=70 dB_Hz is roughly the point at which typical FM receivers will blend from stereo to mono to improve the output audio SNR or SINAD. At low CNR, the ASQM value approaches zero, indicating a non-viable FM signal. At high CNR, the ASQM value approaches one. Because of predetection bandlimiting (for interference reduction) and high modulation (e.g. 100%) the upper limit for ASQM in this plot is about 0.82. This predetection bandlimiting is generally considered beneficial to limit digital-to-analog interference as well as adjacent channel interference, while maintaining a high SINAD.

In another aspect, the invention encompasses a radio receiver that includes an input for receiving signals from one or more of a plurality of antennas and a processor or processing circuitry that performs the ASQM processing described above to produce an ASQM signal quality metric that can be used to select an input signal from one or more of the antennas.

Diversity Control Logic

Figure 5:
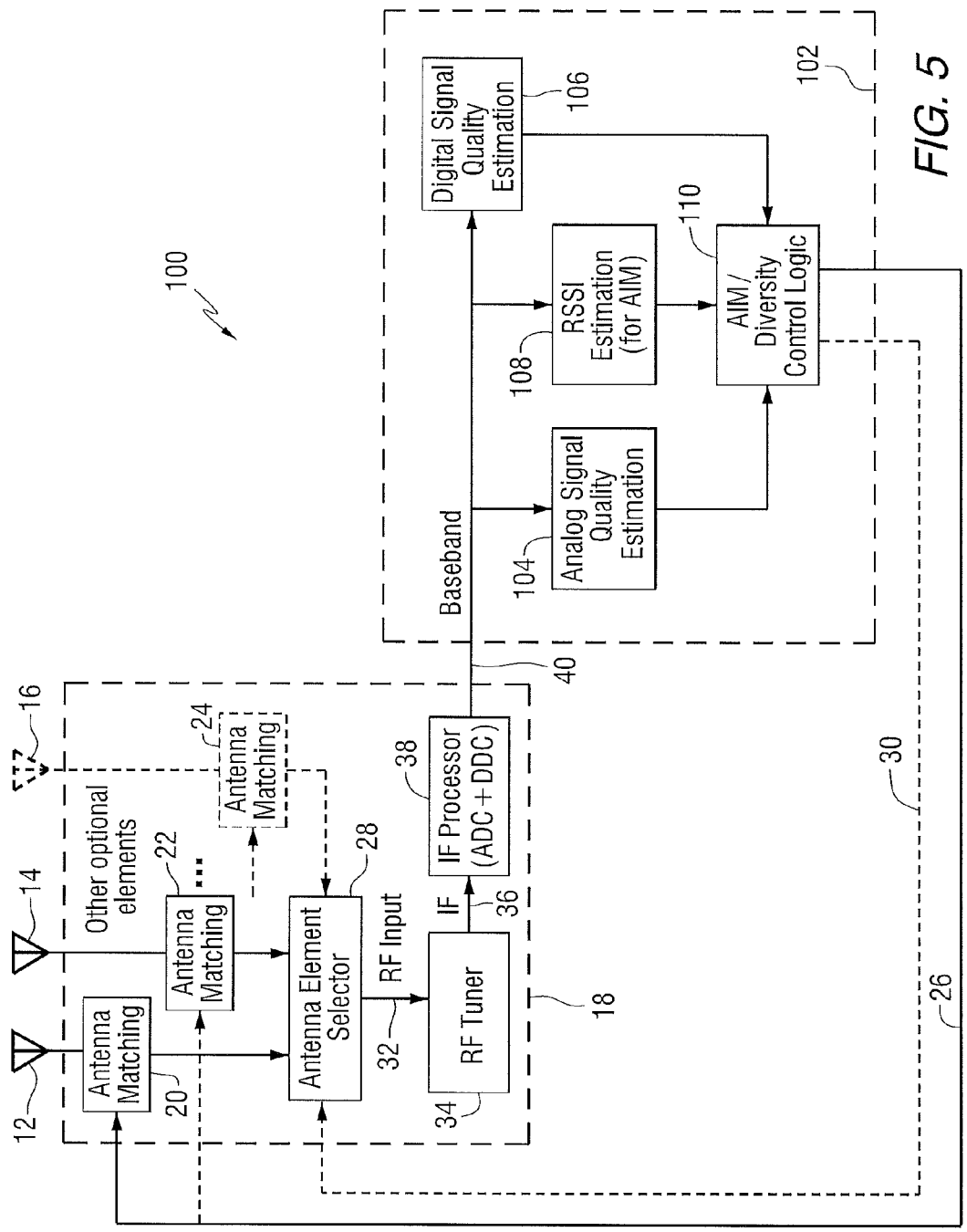
FIG. 5 is a functional block diagram of a receiver that includes antenna diversity using analog and digital signal quality metrics.

Diversity control logic uses the ASQM and DSQM-lite to control the antenna element selector. A functional block diagram of a receiver 100 with diversity switching is shown in FIG. 5. As in the embodiment of FIG. 1, receiver 100 includes multiple antenna elements 12, 14, and 16 and employs antenna element diversity, as well as adaptive impedance matching functions. In one embodiment, an antenna element 12 can be an antenna incorporated into an earbud wire; antenna element 14 can be a loop antenna; and element 16 represents one or more additional, optional antennas. Within an RF/IF processor 18, a first antenna matching circuit 20 dynamically matches the impedance of antenna element 12 to the receiver, a second antenna matching circuit 22 dynamically matches the impedance of antenna element 14 to the receiver, and optional additional antenna matching circuits 24 can be used to dynamically match the impedance of any additional antenna elements to the receiver. While the antenna matching functionality is shown in FIG. 5 as part of the RF/IF processor, this functionality may be implemented in other discrete components of a receiver device such as an RF front end. Antenna element selector 28 selects a signal from one of the antenna elements based on an antenna element diversity control signal 30, and passes that signal as an RF input 32 to RF tuner 34. Alternatively, the antenna element selector can pass on the sum or difference of the signals received on the various antenna elements. RF tuner produces an IF signal 36, which is converted from analog to digital and digitally down converted by IF processor 38 to produce a baseband signal 40 at a rate of 744,187.5 complex samples per second.

The baseband signal is received by baseband processor 102. While the baseband processor performs many functions, only those functions relevant to this description are shown. In FIG. 5, the baseband processor is shown to include an analog signal quality estimation 104, a digital signal quality estimation 106, and a received signal strength indication estimation 108. These estimates are processed by AIM/Diversity control logic 110 to produce the antenna element diversity control signal and the (optional) adaptive impedance matching control signal.

Figure 6:
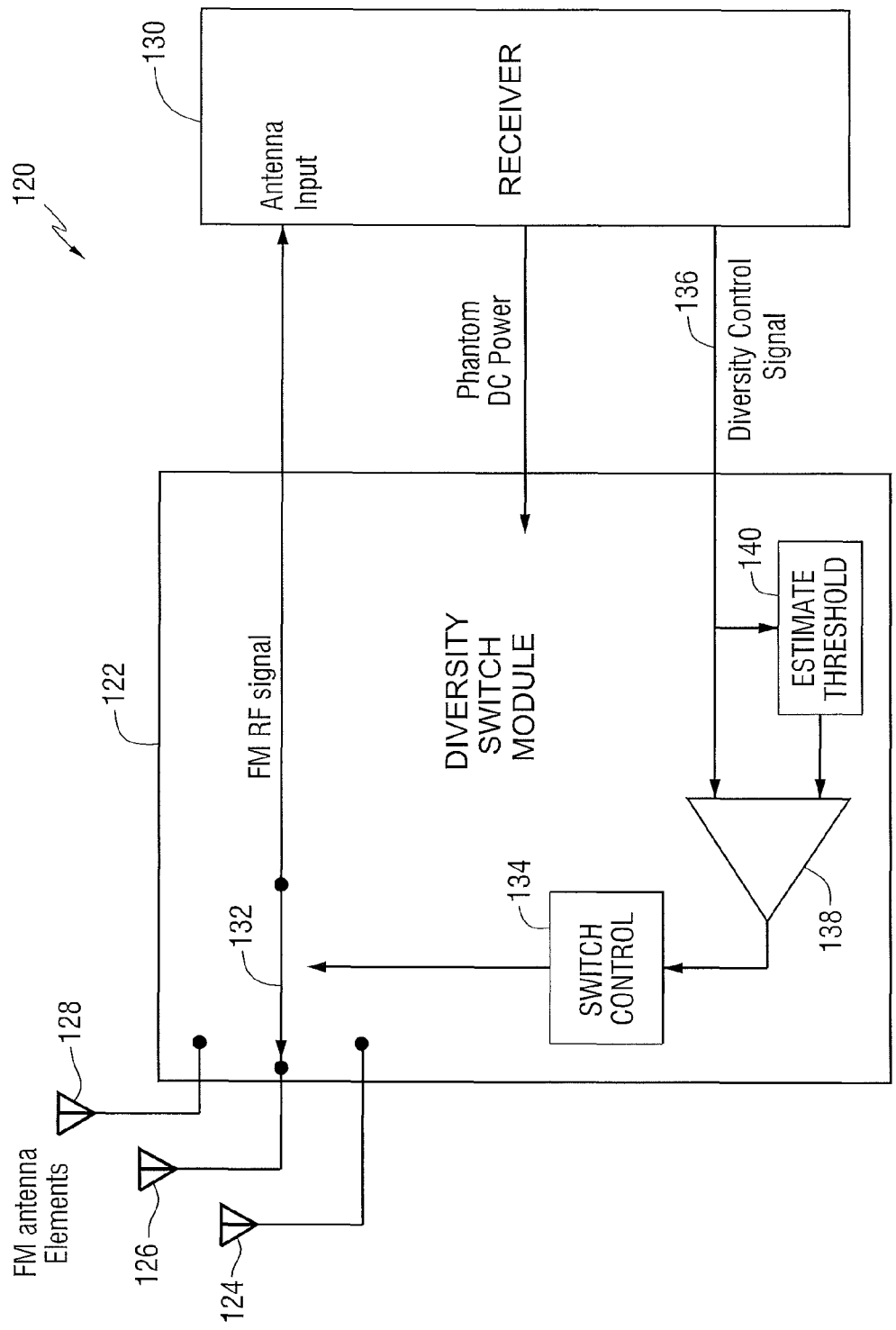
FIG. 6 is a simplified block diagram of an example automotive FM receiver with switched diversity.

FIG. 6 is a simplified block diagram of a typical FM receiver 120 with switched diversity. A diversity switch module 122 is used to couple at least one of a plurality of antenna elements 124, 126 and 128 to a receiver 130. The diversity switch module includes a switch 132 that is controlled by a switch control 134. A diversity control signal on line 136 is provided to an amplifier 138 and a threshold estimator 140 to control the switch control. The phantom DC power in FIG. 6 is DC power applied (multiplexed) onto the same coax used to carry the signal(s). The DC power is used in the remote switch module.

FIG. 6 highlights the main components used for diversity in an automobile application. The diversity switch module is often located at the base of the rear window, and wires embedded in the rear window serve as the antenna elements. This module switches among two or more antenna elements. The module is connected to the car radio receiver via coax cable. The coax cable carries the RF signal from the selected antenna element to the radio receiver, as well as providing dc power from the receiver to the diversity module, and a control signal, typically the FM IF signal at 10.7 MHz, from the receiver to the module. These signals are typically multiplexed on the same coax cable using appropriate filters. The diversity algorithm in the diversity switching module monitors the IF signal from the receiver, and switches to the next antenna element when the signal fails to meet a quality threshold.

Figure 7:
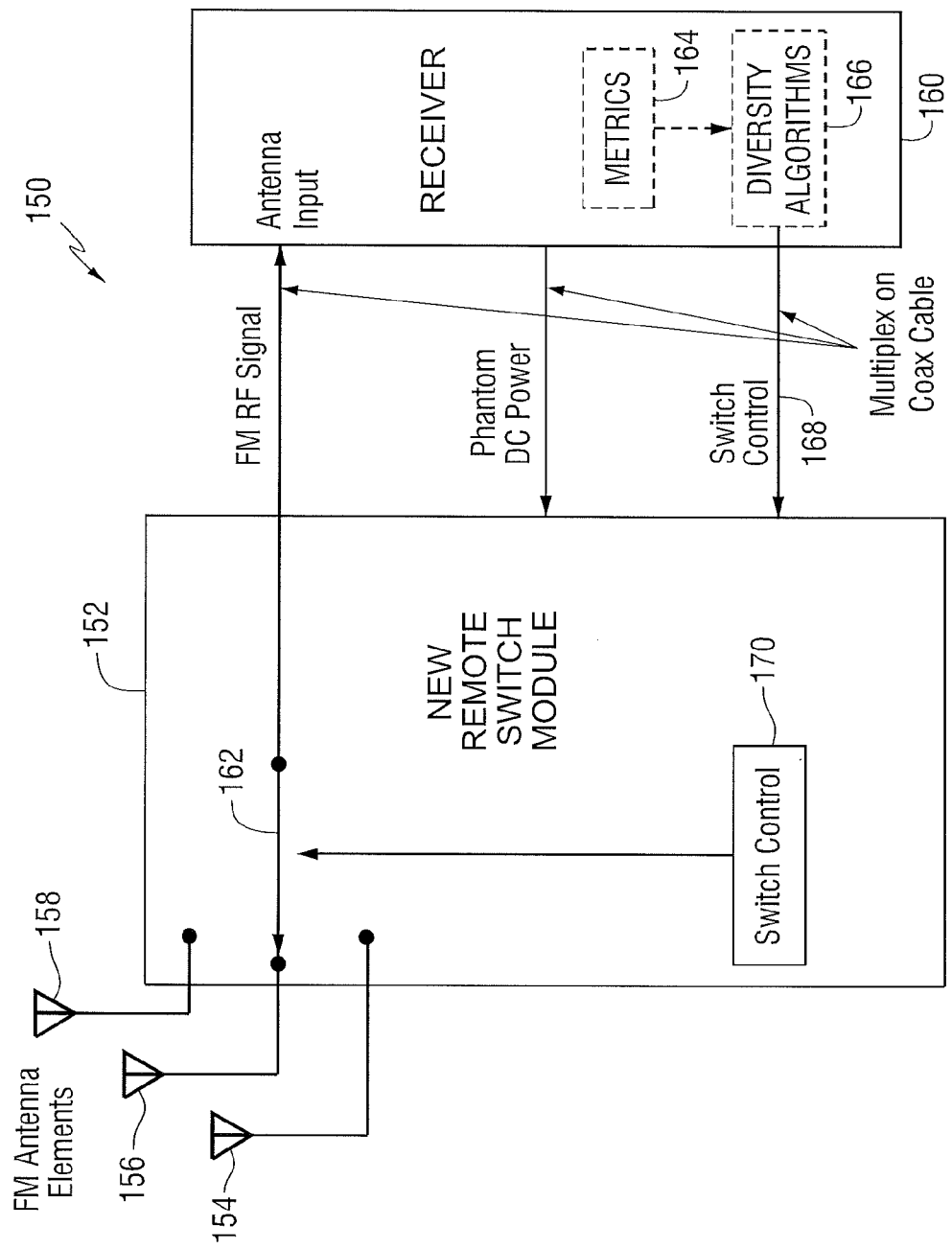
FIG. 7 is a simplified block diagram of an alternate FM IBOC automotive receiver with switched diversity.

FIG. 7 is a simplified block diagram of an FM IBOC receiver 150 with switched diversity, as would be used for diversity in an automobile application. A diversity switch module 152 is used to couple at least one of a plurality of antenna elements 154, 156 and 158 to a receiver 160. The diversity switch module includes a switch 162 that is used to couple at least one of the antenna elements to the receiver. The receiver produces signal quality metrics 164 that are used in diversity algorithms 166 to produce a switch control signal on line 168. A switch control 170 in the remote switch module operates the switch in response to the switch control signal.

Although the functional block diagram of FIG. 7 is similar to a conventional switched diversity system, the diversity control algorithm is now implemented in software in the receiver baseband processor, and the diversity switch module is a simpler switch. The metrics in the receiver are the ASQM and DSQM-lite, as previously described. The diversity algorithms are new, as described herein. The switch control is no longer the FM IF signal as in the conventional diversity systems. However the switch control signal could still be a modulated control signal at the IF frequency, or any other convenient means of signaling to the remote switch module to switch to the next antenna element.

Figure 8:
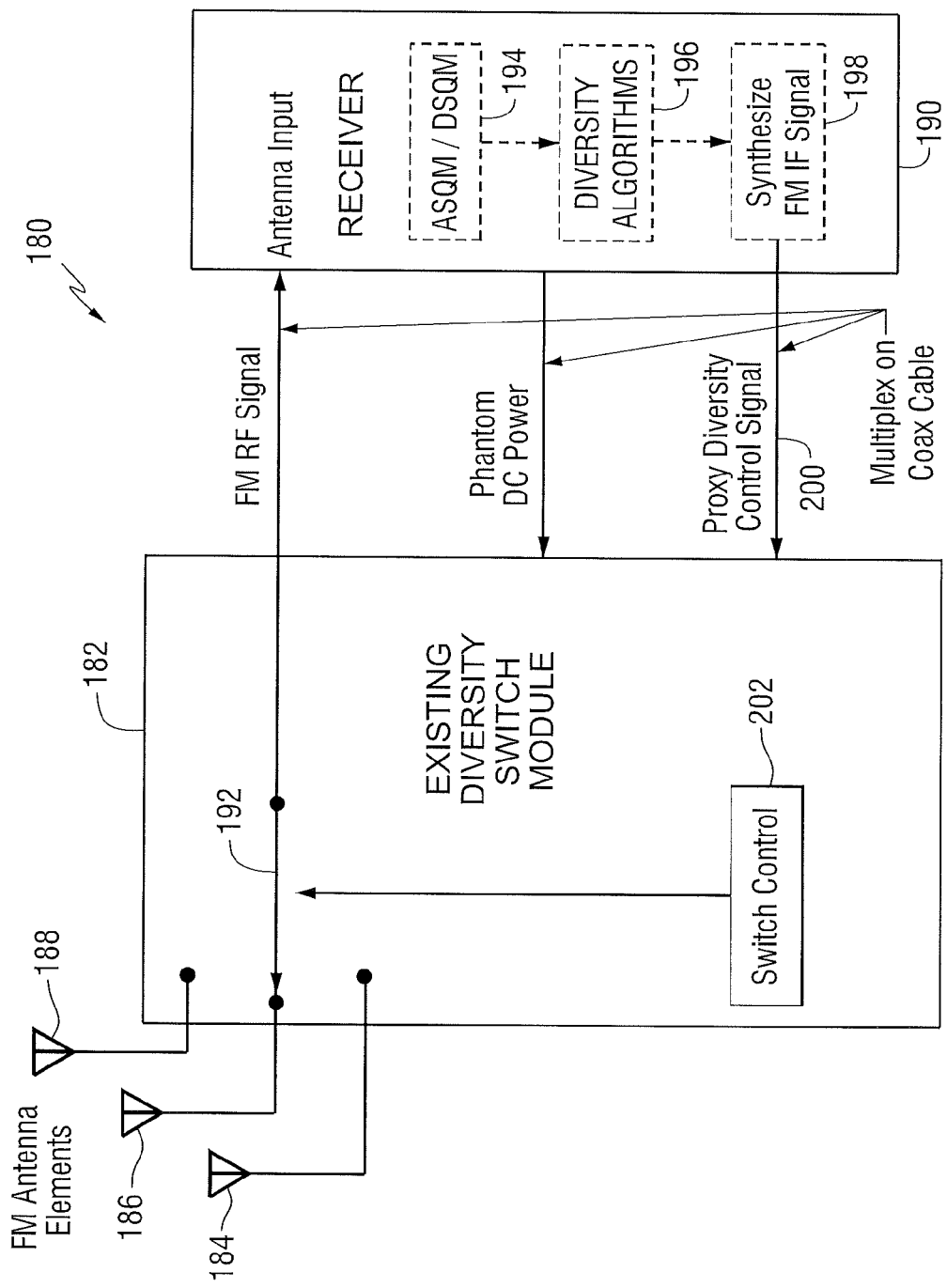
FIG. 8 is a simplified block diagram of an alternate FM receiver with switched diversity using a proxy diversity control signal.

FIG. 8 shows an alternative implementation of an FM IBOC diversity system 180. A diversity switch module 182 is used to couple at least one of a plurality of antenna elements 184, 186 and 188 to a receiver 190. The diversity switch module includes a switch 192 that is used to couple at least one of the antenna elements to the receiver. The receiver produces analog and digital quality metrics 194 that are used in diversity algorithms 196 to control a synthesized FM IF signal 198 that serves as a switch control signal on line 200. A switching circuit 202 controls the switch in response to the switch control signal.

FIG. 8 uses a previously existing switch module as used for conventional FM diversity systems. However, instead of returning the FM IF signal back to the switching module, it synthesizes its own "Proxy diversity control signal" to control the switching action. This Proxy diversity control signal is a synthesized FM IF signal which is generated to convey the switching action required of the diversity algorithms in the previously existing diversity switch module. For example, a simple proxy signaling protocol would be to generate a clean, unmodulated FM IF carrier when no switching is desired; or generate a noise-like FM IF signal when switching is required. The advantage of this proxy solution is that the existing diversity switch modules can be used, provided they are paired with a new receiver that can process the digital signal quality metric described herein (i.e., an FM IBOC receiver).

As shown in FIG. 8, multiple diversity antenna elements are accommodated with a multiposition switch ahead of the tuner's RF input. Separate antenna matching circuits can also be included for each antenna element. Diversity control can be provided by algorithms in the baseband processor. These algorithms rely on both analog and digital signal quality metrics, ASQM and DSQM-lite.

The DSQM-lite is a measure of the quality of the digital signal, and in one embodiment is computed over blocks of 16 OFDM symbols (about 21 times per second). The output value of the DSQM-lite is a number between zero and 1, where 1 indicates a perfect digital (audio) signal quality, and zero indicates that no useful signal exists. A value of 0.5 is roughly the threshold where the digital signal is decodable and useful for audio output. When outputting the audio derived from the digital signal, the diversity switching algorithm attempts to maximize the DSQM-lite value.

The ASQM is a measure of the quality of the analog signal, and is computed at the FM symbol rate (about 344 Hz). It is also possible to aggregate (average) the ASQM values over a number of symbols to provide a more accurate, but slower metric. For example, if the ASQM values are averaged in blocks of 16, then the diversity algorithm would sample both the analog and digital metrics at the same rate. The output value of the ASQM is a number between zero and 1, where 1 indicates a perfect analog (audio) signal quality, and zero indicates that no useful signal exists. A value of 0.5 is about the threshold where a blend between stereo and monophonic audio output would occur. When outputting the audio derived from the FM analog signal, the diversity switching algorithm attempts to maximize the ASQM value.

In one example, the receiver uses blind diversity switching. The goal of the blind diversity switching algorithm is to maximize the value of either the ASQM or DSQM-lite, depending upon whether the audio output is derived from the analog or digital signal. The antenna switch dwells on a particular element until it fails to pass an adaptive threshold. When this occurs, it blindly switches to an alternate antenna element, in a modulo sequence. A threshold test is performed on the currently selected element and the decision to switch is made. The thresholds (or dwell time) are adaptive to prevent excessive switching, as well as preventing excessive dwell time on an element with an inferior signal.

A simple diversity algorithm for the analog FM signal is presented below. When the Signal Quality Metric SQM (either ASQM or DSQM-lite, whichever is appropriate depending on whether the receiver is receiving an FM analog or digital signal) on the present element (ne) falls below the threshold, then switch to the next antenna element, modulo the number of elements.

```
;"SIMPLE DIVERSITY ALGORITHM"
;"Initialize parameters"
    Ne ← 2 ; the number of antenna elements
    Thres ← 0.5
    ne ← 0
while (loop forever)
    Compute SQM_ne for selected antenna element ne
    if SQM_ne < Thres ; if signal fails, then switch to next element
        then ne ← mod(ne + 1,Ne)
```

The simple diversity algorithm uses a fixed SQM threshold, which corresponds to some acceptable level of performance (audio SNR or digital Bit Error Rate, BER). This threshold may, or may not, be above the analog stereo threshold, with the understanding that FM stereo reception degrades the audio SNR by about 22 dB. If the signal on the present antenna element falls below that threshold, then another element is selected. The switching sequence continues until the SQM for an element exceeds the threshold. If this threshold is set too low, then the switch could dwell on a signal with poor audio quality, even if another element has a very good signal. Conversely, if the threshold is set too high, and no elements exceed the threshold, then the switch will continually switch from element to element, even if there is a signal available just below the threshold. Excessive switching is undesirable because it introduces noise into the audio path, and some diversity switching techniques mute the audio signal very briefly after a switch event. The coherent tracking in the digital demodulator is adversely affected by switching transients, typically resulting in random phase steps at the switching instant. These steps result in higher bit decoding errors which degrade the digital signal. Of course, switching is often necessary to avoid a faded signal, or to find a better signal. So there is a compromise between frequent switching (causing noise (analog) and bit errors (digital)), and infrequent switching (dwelling on an inferior signal). The threshold can be made adaptive to balance the goals of the diversity switching. Modifications to the simple diversity algorithm that can be made with an adaptive dwell time are described next.

```
;"DIVERSITY ALGORITHM WITH ADAPTIVE DWELL TIME"
;"Initialize parameters"
    Ne ← 4 ; the number of antenna elements
    dwell ← 0
    for ne ← 0...Ne - 1
        SQM_ne ← 1 ;"SQM is a vector of signal quality values for each antenna element"
while (loop forever)
    Compute SQM_ne for selected antenna element ne
    for k = 1...Ne - 1
        diff_{k-1} ← SQM_ne - SQM_{mod(ne+k,Ne)} ; differences between SQM for other elements
    diffmin ← min(diff)                          ; min difference in SQM from other elements
    if [(dwell > 256 · diffmin) ∨ (SQM_ne < Threshmin)] switch criteria :Threshmin = 0.3, e.g.
        ne ← mod(ne + 1,Ne)                       ; select the next antenna element
```

```
dwell ← 0                                          ; reset dwell
dwell ← dwell + max[0,0.8 − SQM_{ne}] ; increase dwell weighted by SQM degradation (urgency)
```

In the above algorithm, "select the next antenna element" connects the next antenna element in a modulo sequence. The output of the diversity algorithm is an indication to switch to the next antenna element number ne. Then ne can be output from software to a hardware antenna switch to indicate which element to select. Equivalently, the algorithm could simply tell the hardware switch to increment to the next antenna element (modulo Ne) and the actual modulo increment operation can be done in the switch hardware. The dwell variable is compared to 256 times diffmin to determine whether to switch antenna elements. When diff is smaller, the dwell time needed before switching is smaller. Also, dwell is adaptively increased as a function of the SQM (see the last line of the algorithm). This has the effect of accelerating the increase of dwell time when the signal quality is lower, effectively making the switching action more urgent when signal quality is poorer. Thus, both a smaller difference in SQM between the currently selected element and the other elements, and a low SQM on the currently selected element, hasten switching to a new element. Also, if the SQM of the currently selected element is less than any other element, the algorithm will select a new element.

The above adaptive dwell diversity algorithm defines a new variable dwell, and a new vector variable diff. These variables allow the effective threshold to increase to a higher signal quality over the dwell time. The diff variable is a vector that measures the difference in SQM between the selected antenna element and all the other antenna elements. Variable diffmin is the amount that the SQM of the present antenna element exceeds the SQM of the highest other element. The strategy is that the smaller this difference (diffmin), then the sooner (more urgent) the algorithm would want to check on an alternate antenna element. Conversely, if diffmin is large, then there is no urgency in checking for a potentially better antenna element. This difference is used to scale the dwell time, according to this sense of "urgency" based on the probability that a better antenna element may be available. Of course, the algorithm would switch to the next antenna element anyway if the selected antenna element SQM failed to exceed a minimum threshold Threshmin (e.g. Threshmin=0.3), indicating that the signal was not viable.

In an optional embodiment, the diversity algorithm logic then determines a switching sequence that favors the best antenna element. For example, one particular antenna element may generally provide a better signal than other elements or combinations, although occasionally an alternate element or combination is preferred. In this case, the algorithm would learn about the better element, and tend to favor this element more frequently than the other options in its not-quite-blind switching sequence. In this manner, excessive switching due to improbable combinations is avoided, and the switching sequence can adapt to changing conditions based on recent history of states and gradients.

In another aspect, the invention encompasses a method including: receiving a radio signal on a plurality of antenna elements, wherein the radio signal includes an analog modulated portion and a digitally modulated portion; computing an analog signal quality metric for the analog modulated portion of the received radio signal; computing a digital signal quality metric for the digital modulated portion of the received radio signal; and using either the analog signal quality metric or the digital signal quality metric to select one or more of the antenna elements to be connected to a receiver input, wherein a reaction time for selecting the antenna elements based on the analog signal quality metric is shorter than a reaction time for selecting the antenna elements based on the digital signal quality metric. The analog and digital signal quality metrics can be computed as described herein.

In another aspect, the invention encompasses an apparatus including: a plurality of antenna elements for receiving a radio signal, wherein the radio signal includes an analog modulated portion and a digitally modulated portion; a switch for connecting one or more of the antenna elements to an input of a receiver; and a processor for computing an analog signal quality metric for the analog modulated portion of the received radio signal, computing a digital signal quality metric for the digital modulated portion of the received radio signal, and using either the analog signal quality metric or the digital signal quality metric to produce a switch control signal for selecting one or more of the antenna elements to be connected to a receiver input; wherein a reaction time for selecting the antenna elements based on the analog signal quality metric is shorter than a reaction time for selecting the antenna elements based on the digital signal quality metric. The analog and digital signal quality metrics can be computed using a processor as described herein.

The FM HD Radio tuners described above include multiple antenna elements and a multiposition switch to select one or more of the antenna elements. Antenna switching control is provided for controlling the diversity element switch position, as determined by the diversity algorithm. The switching control uses a diversity switching algorithm that can be implemented in baseband processor firmware or in a host controller.

Typical portable receiver antenna elements include an earbud-wire antenna, and one or more internal loop or chip antennas. Multiple elements should be oriented orthogonally, and located in areas of the receiver that are least susceptible to EMI. Some diversity antenna configurations (automotive) use combinations of elements to offer more diversity positions. The antenna switch can either be external, or reside within the tuner chip, ahead of the low noise amplifier. DSQM-lite and ASQM algorithms can be implemented in baseband processor firmware.

While the present invention has been described in terms of its preferred embodiment, it will be understood by those skilled in the art that various modifications can be made to the disclosed embodiment without departing from the scope of the invention as set forth in the claims.

What is claimed is:

1. A method comprising:
   (a) receiving a radio signal on a plurality of antenna elements;
   (b) computing a signal quality metric for the signal received on each of the antenna elements;
   (c) determining a difference value between the signal quality metric for a currently selected antenna element and the signal quality metric for each of the other antenna elements;
   (d) finding the minimum difference value;
   (e) determining (1) if a dwell value is greater than a multiple of the minimum difference value and (2) if the signal quality metric computed for the currently selected antenna element is less than a threshold value; and (f) if either or both of (1) or (2) in step (e) is true, then switching from the currently selected element to one of the other antenna elements for supplying the radio signal to a receiver and repeating steps (b) through (e).

2. The method of claim 1, further comprising:
producing a switch control signal computed in software in the receiver baseband processor, generating a hardware signal output to an external hardware switch; and
connecting one or more of the antenna elements to an input of a receiver in response to the switch control signal.

3. The method of claim 1, wherein the threshold value is about 0.5.

4. The method of claim 1, wherein the dwell value is adjusted based on the signal quality metric for the currently selected antenna element.

5. The method of claim 1, wherein the dwell value is adaptively increased as a function of the signal quality metric.

6. An apparatus comprising:
a plurality of antenna elements configured to receive a radio signal;
a switch configured to connect one or more of the antenna elements to an input of a receiver; and
a processor configured to (a) compute a signal quality metric for the signal received on each of the antenna elements, (b) determine a difference value between the signal quality metric for a currently selected antenna element and the signal quality metric for each of the other antenna elements, (c) find the minimum difference value, (d) determine (1) if a dwell value is greater than a multiple of the minimum difference value and (2) if the signal quality metric computed for the currently selected antenna element is less than a threshold value, and (e) if either or both of (1) or (2) in step (e) is true, then control the switch to switch from the currently selected element to one of the other antenna elements to supply the radio signal to the receiver and repeat (a) through (d).

7. The apparatus of claim 6, wherein the processor computes a switch control signal in software and generates a hardware signal output to control the switch.

8. The apparatus of claim 6, wherein the threshold value is about 0.5.

9. The apparatus of claim 6, wherein the dwell value is adjusted based on the signal quality metric for the currently selected antenna element.

10. The apparatus of claim 6, wherein the dwell value is adaptively increased as a function of the signal quality metric.

11. A method comprising:
receiving a radio signal on a plurality of antenna elements, wherein the radio signal includes a digitally modulated component;
computing a digital signal quality metric for the signal received on each of the antenna elements;
using the digital signal quality metric for an antenna element currently supplying the radio signal to a receiver to determine if diversity switching is desired; and
producing a synthesized FM intermediate frequency proxy control signal that causes a diversity switch control to implement a desired switching of the antenna elements.

12. The method of claim 11, wherein the synthesized FM intermediate frequency proxy control signal comprises:
an unmodulated FM intermediate frequency carrier signal when no switching is desired; or
a noise-like FM intermediate frequency signal when switching is desired.

13. The method of claim 11, wherein the synthesized FM intermediate frequency proxy control signal is produced in software in a baseband processor of a receiver.

14. The method of claim 11, wherein the radio signal comprises:
a hybrid signal including an analog FM component and the digitally modulated component, and the digital signal quality metric is based on the signal quality of the digitally modulated component of the hybrid signal.

\* \* \* \* \*